United States Patent [19]

Kirker

[11] 4,227,370
[45] Oct. 14, 1980

[54] BY-PASS GAS TURBINE ENGINES

[75] Inventor: Timothy J. Kirker, Alvaston, England

[73] Assignee: Rolls-Royce Limited, London, England

[21] Appl. No.: 954,921

[22] Filed: Oct. 24, 1978

[30] Foreign Application Priority Data

Nov. 4, 1977 [GB] United Kingdom ............... 45976/77

[51] Int. Cl.³ .............................................. F02K 3/04
[52] U.S. Cl. ......................................... 60/262; 60/264
[58] Field of Search ................ 60/226, 262, 261, 263, 60/264

[56] References Cited

U.S. PATENT DOCUMENTS 3,633,362  1/1972  Sotheran ................................ 60/261
3,750,402  8/1973  Vdoviak ................................. 60/261

FOREIGN PATENT DOCUMENTS 871016  6/1961  United Kingdom ...................... 60/262

Primary Examiner—Douglas Hart
Attorney, Agent, or Firm—Cushman, Darby & Cushman

[57] ABSTRACT

In a by-pass gas turbine engine, the by-pass exhaust flow is mixed with the core engine exhaust flow internally of the engine before passage through the final exhaust (propulsion) nozzle. The exhaust flow mixer comprises alternate inwardly and outwardly inclined substantially planar "fingers", which are arrayed around and attached to the circumference of the aft end of the core engine and extend generally downstream thereof. The fingers are effective to deflect the exhaust flows by virtue of the Coanda effect.

2 Claims, 3 Drawing Figures

BY-PASS GAS TURBINE ENGINES

The present invention relates to by-pass gas turbine aeroengines provided with exhaust flow mixers for mixing the by-pass flow and the core engine exhaust flow internally of the engine to produce a combined jet efflux, which then passes to atmosphere via a propulsion nozzle. The invention is particularly concerned with an improved structure for such a mixer.

Until the present invention, mixing of by-pass and core exhaust flows within by-pass gas turbine aeroengines has been accomplished using so-called "lobed" or "chuted" exhaust mixers, such as have been used on Rolls-Royce Limited, London, England, "Spey" (Registered Trade Mark) series of engines. Such mixers are used in order to produce a more uniform velocity and temperature across the diameter of the combined jet efflux. Efficient mixing of the by-pass and core flows can lead to an increase in thrust and hence a decrease in the specific fuel consumption of the engine. It is also desirable for aerodynamic and acoustic reasons.

However, since the mixers are sheet metal constructions, each one contributes a significant amount of weight to the engine. Existing types of mixer are already highly refined designs in which weight has been reduced to a minimum, and hence in order to further reduce the contribution of mixers to total engine weight, a new type of mixer is required. Prior art mixers are also expensive to fabricate, and a simpler, less expensive mixer is desirable.

The present invention contributes towards the solution of these problems by utilising the Coanda Effect to achieve a simpler, lighter mixer. According to the present invention there is provided an exhaust flow mixer for installation in the exhaust system of a by-pass gas turbine engine between the aft end of the core engine and the final exhaust nozzle in order to mix the core engine exhaust flow with the by-pass exhaust flow before exit from said nozzle, said mixer comprising first and second sets of discrete, elongate, substantially planar flow surfaces arranged in an annular array such that when said mixer is installed as aforesaid, said flow surfaces extend generally downstream of the aft end of the core engine and are attached thereto at their upstream ends, each said flow surface being circumferentially spaced apart from the adjacent flow surfaces in the same set, the first set of flow surfaces defining a first truncated conoid which converges in the downstream direction so as to extend through the region of core engine exhaust flow, whereby some of the by-pass exhaust flow is deflected into the region of the core engine exhaust flow, and the second set of flow surfaces defining a second truncated conoid which surrounds the first conoid and diverges in the downstream direction so as to extend through the region of by-pass exhaust flow, whereby some of the core engine exhaust flow is deflected into the region of the by-pass exhaust flow, the flow surfaces being effective to deflect the flows as aforesaid by virtue of the Coanda effect.

Preferably, a first annular portion interconnects the downstream ends of the flow surfaces in the first set and a second annular portion interconnects the downstream ends of the flow surfaces in the second set.

The invention includes a by-pass gas turbine engine incorporating an exhaust flow mixer according to the invention.

An embodiment of the invention will now be described, by way of example only, with reference to the accompanying drawings, in which.

The drawings are not to scale.

Figure 1:
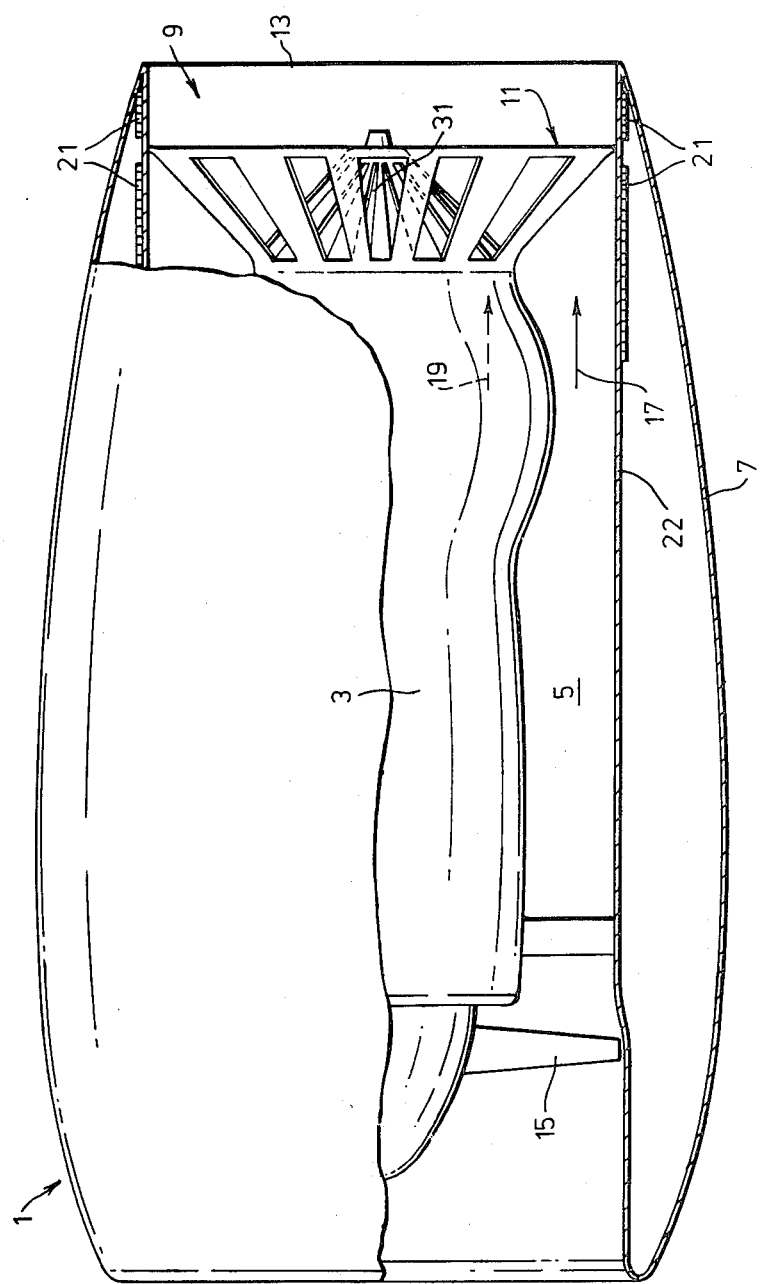
FIG. 1 is a diagrammatic view of a high by-pass ratio gas turbine aeroengine with the outer casing cut-away to reveal internal structure, including an exhaust flow mixer in accordance with the present invention.

Referring first to FIG. 1, a gas turbine aeroengine 1 is of the type having a core engine 3, a by-pass duct 5 defined by by-pass duct casing 7 surrounding the core engine 3, an exhaust system 9 including an exhaust flow mixer 11, and a final exhaust (propulsion) nozzle 13. The by-pass duct is supplied with by-pass air from front fan 15, which also supplies core engine 3, the fan 15 being driven from a turbine 16 (FIG. 2) in core engine 3. By-pass exhaust flow 17 and core engine exhaust flow 19 are mixed in the exhaust system 9 to produce a combined efflux, which passes to atmosphere through propulsion nozzle 13.

In the engine 1, the by-pass flow 17 is a low temperature, low velocity flow, whilst the core engine exhaust flow 19 is a high temperature, high velocity flow. Were these two flows to be allowed to issue from propulsion nozzle 13 without first being forcibly mixed internally of the engine, mixing would proceed naturally for a considerable number of nozzle diameters donwstream of the engine, the velocity and temperature disparity between the core engine exhaust flow 19 and the surrounding by-pass flow 17 causing a significant amount of "jet noise" throughout the mixing zone. Inclusion of the exhaust flow mixer 11 within the engine 1 ensures that by the time the combined efflux exits from propulsion nozzle 13, the noisiest part of the mixing process has been accomplished and the efflux is approaching homogeneity. Note that use of an internal mixer 11 allows absorption of mixing noise as it arises by means of sound absorbing lining 21 in the by-pass duct wall 22.

Another significant benefit is realised in terms of an increase in thrust at the propulsion nozzle relative to an unmixed jet. It can be thermodynamically proved that the sum of the thrusts available from a hot high velocity core engine exhaust flow surrounded by a cool low velocity by-pass flow is less than the thrust available from a homogeneous jet resulting from thorough mixing of core engine exhaust and by-pass flows before exit from the propulsion nozzle. Since greater thrust is being produced per unit weight of fuel burnt, efficient mixing of the core engine exhaust and by-pass flows in this way increases the fuel economy of the engine.

Figure 2:
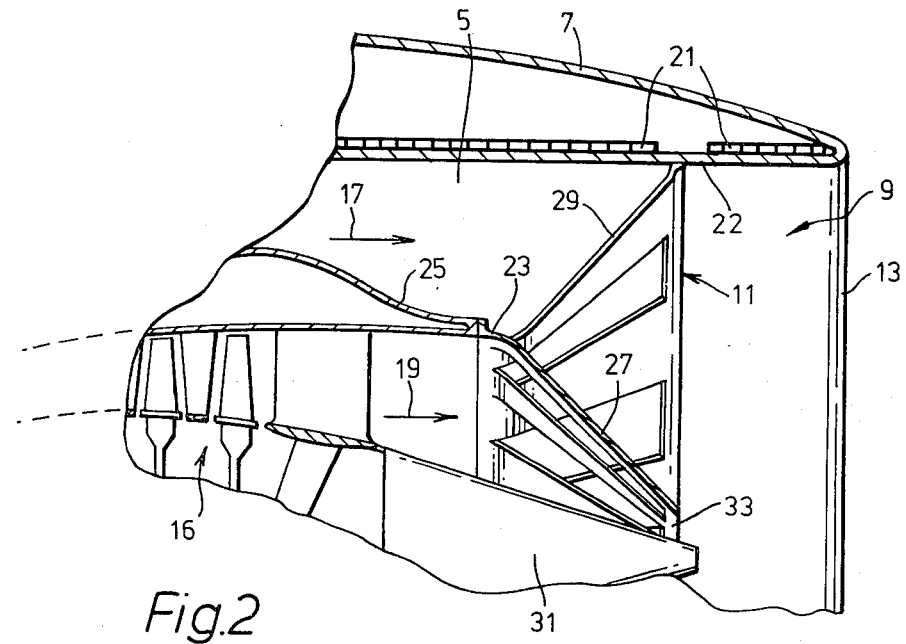
FIG. 2 is a more detailed part-sectional view of the exhaust system of the engine with associated components.
Figure 3:
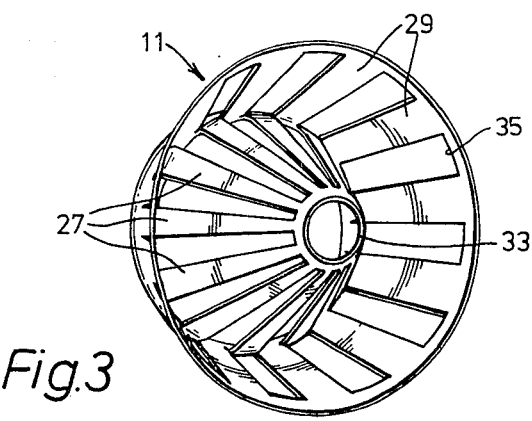
FIG. 3 is a perspective drawing of the flow mixer per se.

Referring now to FIGS. 2 and 3, the exhaust flow mixer 11 is of a novel type, contributing towards savings in weight, manufacturing complexity and expense compared to the above mentioned known mixers. It is joined by flanged ring 23 to the extreme downstream periphery of the core engine 3, i.e. to the downstream extremity of the core engine casing 25. The mixer 11 comprises first and second sets of discrete elongate substantially planar flow surfaces or "fingers" 27, 29 respectively, which are all joined to the flanged ring 23 and project from the casing 25 at the aft end of the core engine 3 in directions which are generally downstream of the core engine but also transverse of the by-pass and core engine exhaust flows 17 and 19 respectively. As will be seen from the drawings, the fingers of the first set 27 alternate with the fingers of the second set 29 in peripheral sequence around casing 25. Each finger is circumferentially spaced apart from the adjacent fingers in the same set.

The first set of fingers 27 extend into the region of core engine exhaust flow 19. An appreciable proportion of the by-pass exhaust flow 17 is thereby deflected, by virtue of the Coanda Effect, into the region of core engine exhaust flow 19. The second set of fingers 29 extend into the region of by-pass exhaust flow 17, thereby deflecting an appreciable proportion of the core engine exhaust flow 19 into the region of the by-pass exhaust flow 17.

The effectiveness of the fingers 27 and 29 in deflecting the exhaust flows, thereby promoting rapid mixing of the by-pass and core engine exhaust flows to produce a combined jet efflux, is due to the Coanda Effect as mentioned above. Using the Coanda Effect, fluid flows can be caused to change their direction of flow by locating suitably shaped flow surfaces in their flow paths, the fluid tending to "adhere" to the surfaces as it flows over them. This adherence is due to the existence of a relatively stagnant boundary layer of fluid close to the surfaces; but the further away from a flow surface a portion of fluid is, the less influence the Coanda Effect has on its direction of motion. Thus, in the case of the present mixer 11, some portions of the by-pass or core engine exhaust flows pass through the mixer without being substantially deflected, since they pass through at those radial and angular positions which are furthest away from the influence of the Coanda Effect. They then mix with those portions of the flow which have been deflected towards them.

Concerning the overall structure and shape of the exhaust flow mixer 11, it will be noticed that the first set of flow surfaces or fingers 27 defines a first truncated conoid which converges in the downstream direction and surrounds the core engine exhaust cone 31, leaving a convergent annular space therebetween.

The second set of fingers 29 defines a second truncated conoid which diverges in the downstream direction and which surrounds the first conoid.

In order to secure the ends of the fingers against excessive vibration and movement in the flows, an annular portion or ring 33 interconnects the downstream ends of the first set of fingers 27, which form the inner conoid, and another annular portion or ring 35 similarly interconnects the downstream ends of the second set of fingers 29, which form the outer conoid. The periphery of ring 35 is secured to the by-pass duct wall 22.

It might be thought that a mixer like the one described in this specification would have an unacceptably low aerodynamic efficiency, due, for instance, to turbulence in the flow through the spaces between the fingers. However, against expectations, the aerodynamic efficiency of the mixer is acceptable, probably due to the dominance of the Coanda Effect in the flow of gases over the fingers.

I claim:

1. For a by-pass gas turbine engine of the type having a core engine, a by-pass duct surrounding the core engine, and an exhaust system including a final exhaust nozzle, an improvement in an exhaust flow mixer for installation in said exhaust system between an aft end of said core engine and said final exhaust nozzle, said mixer comprising first and second sets of discrete, elongated, substantially planar flow surfaces arranged in an annular array, said mixer being installed in said exhaust system with said planar flow surfaces extending generally downstream of said aft end of said core engine and attached thereto at their upstream ends, said planar flow surfaces of said first set having downstream extending edges along a major portion of their lengths unattached to downstream extending edges of said planar flow surfaces of said second set, each of said flow surfaces being circumferentially spaced apart from an adjacent one of said flow surfaces in the same set, said first set of flow surfaces defining a first truncated conoid converging in a downstream direction so as to extend through a region of the core engine exhaust flow whereby some of the by-pass exhaust flow is deflected into the region of said core engine exhaust flow, and said second set of flow surfaces defining a second truncated conoid surrounding said first conoid and diverging in the downstream direction so as to extend through a region of by-pass exhaust flow whereby some of said core engine exhaust flow is deflected into the region of said by-pass exhaust flow.

2. An exhaust flow mixer as claimed in claim 1 in which a first annular portion of said mixer interconnects downstream ends of the flow surfaces in the first set and a second annular portion of the mixer interconnects downstream ends of the flow surfaces in the second set.

* * * * *